Figure 1:
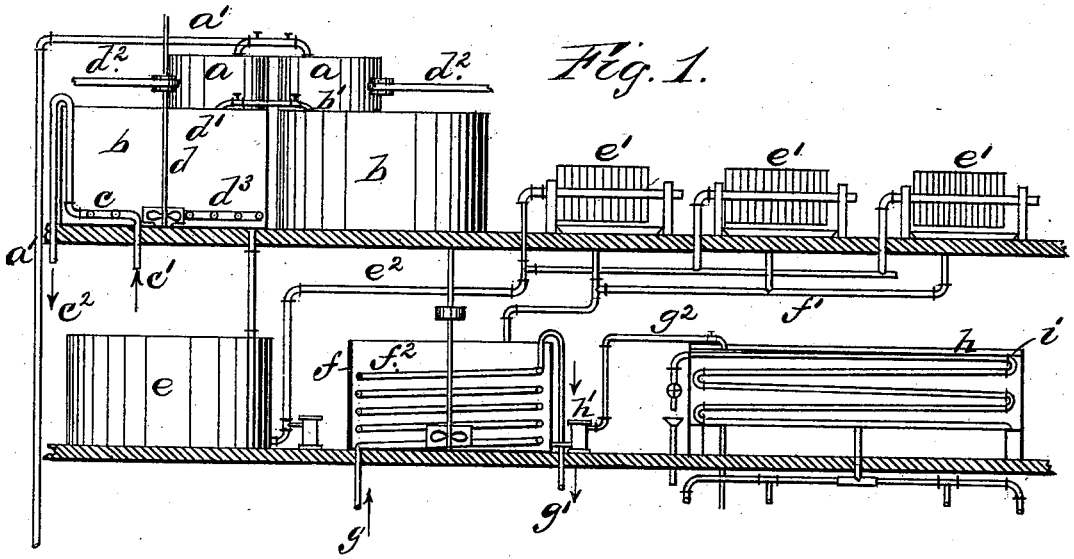
Figure 2:
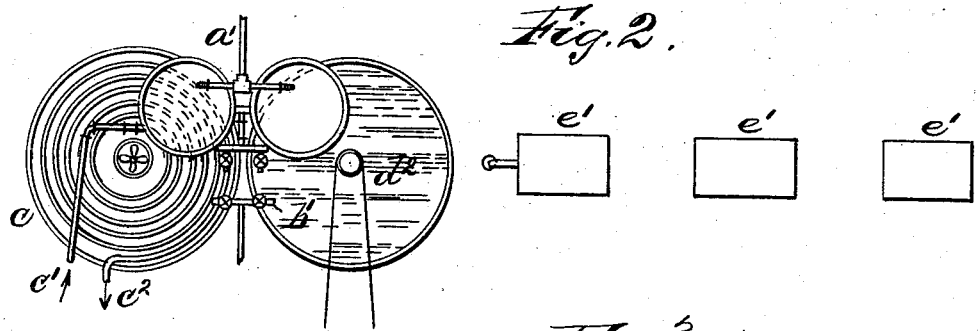
Figure 3:
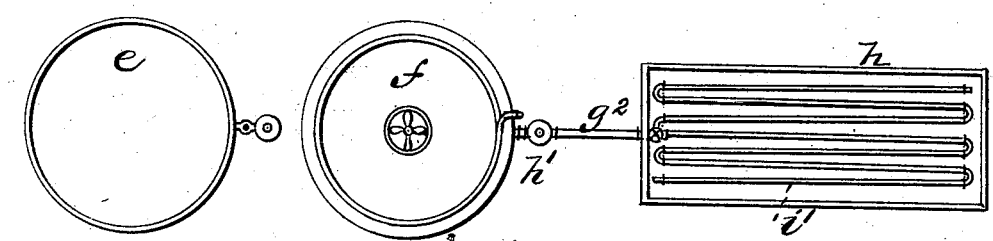
Figure 4:
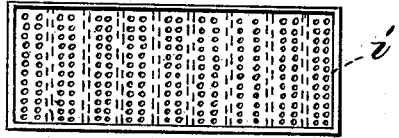

(No Model.)

A. GIESECKE & H. HAMLIN.
PROCESS OF MANUFACTURING CORN SIRUP.

No. 253,919. Patented Feb. 21, 1882.

WITNESSES:
George H. Sonneborn.
W. H. Sonneborn.

INVENTORS
Adolph Giesecke
Harry Hamlin
By John R. Bennett
ATTORNEY

UNITED STATES PATENT OFFICE.

ADOLPH GIESECKE AND HARRY HAMLIN, OF BUFFALO, NEW YORK; SAID GIESECKE ASSIGNOR TO SAID HAMLIN.

PROCESS OF MANUFACTURING CORN-SIRUP.

SPECIFICATION forming part of Letters Patent No. 253,919, dated February 21, 1882.

Application filed January 5, 1882. (No model.)

*To all whom it may concern:*

Be it known that we, ADOLPH GIESECKE, a subject of the Emperor of Germany, and HARRY HAMLIN, a citizen of the United States, both residing in Buffalo, in the county of Erie and State of New York, have invented certain new and useful Improvements in the Process of Manufacturing Corn-Sirup, of which the following is a specification.

Our invention relates to the manufacture of the compound sirup of glucose and cane-sirup.

In preparing glucose or corn-sirup for the market by any of the well-known methods, a certain percentage of cane-sirup is mixed with the glucose for the purpose of flavoring it. Prior to our invention the cane-sirup was mixed with filtered glucose at the ordinary atmospheric temperature, and the practical result of the manufacture in this mode was that the compound sirup soon lost its brightness of color and that its lasting qualities became impaired, this result being due, in our opinion, to the fact that the impurities of the cane-sirup were not removed either before or after the mixture.

The object of our invention is to produce a compound sirup which is free from the said defects; and it consists of the process of manufacturing a compound of glucose and cane-sirup by mixing the said two ingredients and subjecting the mixture to heat at a temperature of 160° Fahrenheit, more or less, and subsequently separating the precipitated matter from the compound sirup, our invention being based upon the discovery that when the mixture of the two kinds of sirup is subjected to heat and agitation the impurities of the cane-sirup are rapidly precipitated, and may then be separated from the mixture by filtration, provided the sulphate of lime usually present in the unfiltered glucose (or some substitute therefor) be present in the mixture.

Our invention consists, further, of certain additional steps in the process, by means of which the color of the compound sirup is adjusted when required and the rapid cooling of the same to the proper temperature for barreling is effected.

In the drawings is shown a suitable apparatus for carrying out our invention, in which Figure I is a section through the floors of a building, showing a side elevation of the apparatus complete, one of the mixing-tanks, the regulating-tank, and a box-cooler being shown in section. Fig. II is a plan view of the apparatus on the upper section of floor, one of the mixing-tanks being represented as full of sirup and the other empty, so as to show the heating-coil of steam-pipe and an agitating or mixing-wheel at the bottom of the tank. Fig. III is a top view of that portion of the apparatus arranged on the lower floor, showing the receiving-tank, the regulating-tank, and the box-cooler having its perforated top removed; and Fig. IV is a plan of the box-cooler having its perforated top in place.

In carrying our invention into practice we make use of unfiltered glucose, by which we mean glucose from which the sulphate of lime produced in its manufacture has not been separated by filtration. The unfiltered glucose is put into the mixing-tanks $b$ through the pipes $b'$, and the desired quantity or percentage of cane-sirup is drawn into the mixing-tanks from the measuring-tanks $a$. (Shown in Figs. I and II.) The measuring-tanks $a$ are supplied with cane-sirup through a pipe, $a'$. When the cane-sirup and unfiltered glucose are put into the mixing-tanks $b$ they are thoroughly agitated and mixed together by the revolving wheel $d$, receiving its movement from the vertical shaft $d'$ and belt and pulley $d^2$, or other suitable agitating device, which produces a current in the sirup sufficient to cause it to come in contact with the hot coil of steam-pipe $c$, adapted to receive a current of steam through them from $c'$ to $c^2$, they being connected in any suitable and well-known way to pipes connected with a steam-boiler, by means of which the temperature of the mixture is raised to from 160° to 190° Fahrenheit, depending upon the condition of the materials or other circumstances. The mixed cane-sirup and unfiltered glucose is next conducted to the receiving-tank $e$, and is forced from thence in its heated condition to and through the filters $e'$ through the pipes $e^2$. As the receiver $e$ is used for convenience when large quantities of corn-sirup are made, it may in some cases be dispensed with, in which case the sirup may be conducted directly from the mixing-tank to the filters. The filters which we prefer to use are made in the ordinary way, and consist of a series of grooved plates with the usual cloths and perforated diaphragms fastened together in the usual manner. As such filters are well known for similar purposes, a minute description of them is unnecessary. From the filters the corn-sirup is conducted to the regulating-tank $f$ (see Figs. I and III) through the pipe $f'$ and its connections. In this tank the sirup is agitated and made to circulate around the cooling-coil $f^2$, which coil is supplied with cold water, passing in at $g$ and out at $g'$, so that the cold water passes through the coil from the bottom of the tank upward, the end $g$ of the coil being connected in any well-known way with a pipe leading from a pump or other well-known water-forcing device.

The color of the compound sirup may, if necessary, be adjusted in the regulating-tank. Thus, if the color be too light to suit the trade, a small portion of the cane-sirup or of caramel may be added, and a small portion of glucose will correct the color if it be too dark. From the regulating-tank the sirup is conducted through the pipe $g^2$, or any other suitable arrangement of pipes, to the box-cooler $h$, where it passes through the perforated top $i$, from which it passes in a finely-divided state to and down around the cooling-coils $i'$, which coils are supplied with cold water, passing in at the bottom and out from the top of the coil.

With the apparatus arranged as represented in the drawings, a pump, $h'$, is required to force the corn-sirup to the box-cooler; but if the latter be arranged on a floor below the regulating-tank the pump may be dispensed with. The contact of the sirup with the cold-water pipes cools it rapidly, and the sirup, after passing through this box-cooler, is sufficiently cool to be drawn off into barrels.

We do not wish to be understood as restricting the invention to the exact manipulations hereinbefore set forth, as the sirups may be mixed in other ways without departing from the principle of our invention, provided the mixture be subjected to the required amount of heat and agitation. Thus the cane-sirup may be introduced into the vacuum-pan in which the glucose is concentrated, and there mixed with the glucose when it has been boiled down to a proper consistency. This may be accomplished in the following manner: The draw-in pipe through which the glucose is introduced into the vacuum-pan is connected with another pipe leading into a tank containing any desired measured quantity of cane-sirup. After the boiling of the glucose is completed and before the vacuum is taken off, the valves in the pipe are opened and the cane-sirup drawn into the pan. The steam is kept turned on in the pan, and, if necessary, the boiling operation can be continued until sufficient agitation and mixture of the sirups is effected. The mixture can then be passed through the form of filter shown in the drawings or through bag-filters, as may be deemed desirable.

In practicing the process as above set forth we have found that the sulphate of lime present in the mixture of sirups is deposited upon the filter-cloths, and that it appears to be an important factor in the precipitation of the impurities of the cane-sirup and in the operation of filtration. Hence the glucose should either be used in an unfiltered condition, so that sulphate of lime may be present in the mixture to be filtered, or, if filtered glucose be used, some ingredient or ingredients which will act as a substitute for the said sulphate of lime should be incorporated in the mixture previous to filtration. The temperatures above mentioned (160° to 190° Fahrenheit) are those which we have used with success. Thus, if a light-colored sirup is to be manufactured, we find it expedient to heat the mixture of sirups to 160° Fahrenheit, and when a dark-colored sirup is to be manufactured we find it expedient to heat the mixture up to 190° Fahrenheit, as the higher the heat the greater the facility of filtering the mixture. The time required for the application of heat and agitation will of course depend upon the circumstances of each particular case. With ordinary cane-sirup as now sold in the market we have found by practice that a mixture of about thirty-five hundred gallons of the two sirups can be heated up to a temperature of 160° Fahrenheit, with the requisite agitation, in about an hour, with a precipitation of practically all the matter that would otherwise tend to render the mixture cloudy, and that the mixture can then be drawn from the mixing-tank and subjected to filtration.

Although the above-mentioned temperature and time for subjecting the mixture to the heat and agitation have given the best results, we do not wish to be understood as restricting the invention to them, as we have found that good results may be attained at lower and higher temperatures, and with a more prolonged treatment by heat and agitation.

We claim as our invention—

1. The process, substantially as before set forth, of manufacturing the compound of glucose and cane-sirup, consisting of the mixture of the two sirups and the subjection of the mixture to heat and agitation.

2. The process, substantially as before set forth, of manufacturing the compound of glucose and cane-sirup, consisting of the mixture of the two sirups, the subjection of the mixture to heat and agitation, and the subsequent filtration of the mixture.

3. The process, substantially as before set forth, of manufacturing the compound of glucose and cane-sirup of the required color, consisting of the mixture of the two sirups, the subjection of the mixture to heat and agitation, the subsequent filtration of the mixture, and the adjustment of the color subsequent to filtration.

4. The process, substantially as before set forth, of manufacturing the compound of glucose and cane-sirup in a condition ready for barreling it, consisting of the mixture of the two sirups, the subjection of the mixture to heat and agitation, the subsequent filtration of the mixture, and the rapid cooling of the filtered product.

In witness whereof we have hereunto set our hands this 3d day of January, A. D. 1882.

ADOLPH GIESECKE.
HARRY HAMLIN.

Witnesses:
W. S. ELLIOTT,
C. D. ELLIS.